United States Patent [19]

Udipi

[11] Patent Number: 5,162,416
[45] Date of Patent: Nov. 10, 1992

[54] IMPACT RESISTANT POLYESTER BLENDS

[75] Inventor: Kishore Udipi, Longmeadow, Mass.

[73] Assignee: Monsanto Company, St. Louis, Mo.

[21] Appl. No.: 325,253

[22] Filed: Mar. 17, 1989

[51] Int. Cl.$^5$ .................. C08L 67/02; C08L 51/04; C08L 55/02

[52] U.S. Cl. .................... 524/399; 524/394; 525/64; 525/166; 525/173

[58] Field of Search ............ 524/394, 399; 525/64

[56] References Cited

U.S. PATENT DOCUMENTS

| Re. 32,334 | 1/1987 | Deyrup | 524/292 |
|---|---|---|---|
| 3,919,353 | 11/1975 | Castelnuovo et al. | 260/873 |
| 4,096,202 | 6/1978 | Farhnam et al. | 260/873 |
| 4,368,286 | 1/1983 | Hayashi et al. | 524/394 |
| 4,417,026 | 11/1983 | Lindner et al. | 525/64 |
| 4,483,949 | 11/1984 | Semen et al. | 523/514 |
| 4,526,923 | 7/1985 | Hornbaker et al. | 524/502 |
| 4,659,767 | 4/1987 | Dunkle et al. | 524/504 |

FOREIGN PATENT DOCUMENTS

56123A2 7/1982 European Pat. Off. .
8304038 11/1983 PCT Int'l Appl. .

*Primary Examiner*—Patricia A. Short
*Attorney, Agent, or Firm*—Thomas E. Kelley; Richard H. Shear

[57] ABSTRACT

Impact resistant polymer blends of crystallizable polyester, e.g. PET, and styrene copolymer graft rubber composition, e.g. ABS, and an impact modifying amount of a mixture of a fatty acid salt, e.g. sodium stearate, and an acid copolymer, e.g. SMA, are useful as engineering thermoplastics, e.g. for injection molding of articles requiring high impact resistance.

11 Claims, No Drawings

IMPACT RESISTANT POLYESTER BLENDS

Disclosed herein are impact resistant polymer blends of crystallizable polyester and graft rubber compositions which are resistant to crystallization and methods of making such blends using an impact modifying amount of a mixture of acidified styrenic polymer and fatty acid salt. Also disclosed are methods of using such blends as engineering thermoplastic molding resins.

BACKGROUND OF THE INVENTION

Polyethylene terephthalate (PET) when used as a thermoplastic molding resin crystallizes slowly at moderate molding temperatures, e.g. below 130°. Deyrup in reissued U.S. Pat. No. Re. 32,334 discloses the use of a sodium or potassium salt of a hydrocarbon acid, e.g. stearic acid, together with other low molecular weight organic compounds to provide a reinforced PET molding resin that crystallizes rapidly at low temperatures. The value of alkali metal salts of fatty acids as crystallization accelerators for PET is also disclosed by Hayashi et al. in U.S. Pat. No. 4,368,286. Such crystallized PET molding resins generally are brittle, i.e. have low impact resistance.

Castelnuovo et al. disclose in U.S. Pat. No. 3,919,353 impact resistant molding compositions comprising PET and up to about 30% of graft rubber composition, e.g. crosslinked butadiene grafted with styrene and methyl methacrylate (MBS).

Lindner et al. disclose in U.S. Pat. No. 4,417,026 thermoplastic polyester molding compositions having improved toughness comprising blends of polyester, e.g. PET, and up to 40% by weight of graft copolymer having a diene rubber core surrounded by an acrylate rubber first shell and a thermoplastic outer shell.

Farnham et al. disclose in U.S. Pat. No. 4.096,202 impact resistant polyester, e.g. PET, and acrylate core shell copolymers.

Dunkle et al. disclose in U.S. Pat. No. 4,659,767 impact modified polyester blends comprising PET, acrylate core shell polymer and acid-containing olefin copolymers, e.g. ethylene methacrylic acid copolymer, and zinc salts thereof.

Hornbaker et al. disclose in U.S. Pat. No. 4,526,923 blends of PET and styrene maleic anhydride copolymers including rubber-modified copolymers which have relatively poor notched impact resistance.

Semen et al. disclose in U.S. Pat. No. 4,483,949 that nucleating agents such as sodium stearate have an adverse effect on the toughness of blends of PET and styrene-maleic anhydride copolymers.

SUMMARY OF THE INVENTION

I have discovered that thermoplastic molding compositions comprising polymer blends of crystallizable polyester, e.g. PET, and styrenic copolymer grafted rubber compositions, e.g. ABS, can be provided with surprisingly high impact resistance by adding to such blends an impact modifying amount of a mixture of an acid copolymer and a fatty acid salt.

DETAILED DESCRIPTION OF PREFERRED EMBODIMENTS

The impact resistant thermoplastic molding compositions provided by this invention comprise a crystallizable polyester component such as PET, e.g. at least about 50 percent by weight PET. For certain preferred applications the blends of this invention comprise crystallizable polyester consisting essentially of PET. For other preferred applications the blends of this invention comprise polyester which is a mixture of PET and amorphous polyester such as copolyesters of terephthalic acid and mixtures of ethylene glycol and 1,4-cyclohexanedimethanol, e.g. PETG and PCTG available from Eastman Chemical Company.

The styrenic copolymer grafted rubber composition used in the polymer blends of this invention comprises from 5 to 80 weight percent of a substrate rubber having a glass transition temperature below 0° C. and from 95 to 20 weight percent of a grafted styrenic copolymer consisting essentially of from 20 to 75 parts by weight of a styrene monomer and from 80 to 25 parts by weight of a polar monomer selected from $C_1$ to $C_4$ alkyl (meth)acrylate and (meth)acrylonitrile, said monomers having been polymerized in the presence of and grafted onto the substrate rubber, e.g. by well known methods such as graft emulsion polymerization. Styrene monomers can comprise styrene, substituted styrene such as alpha-methyl styrene, chlorostyrene, bromostyrene, para-methyl styrene and the like or a mixture thereof. The substrate rubber can be crosslinked, and in many cases is preferably crosslinked, and can comprise a butadiene rubber, including nitrile rubber and styrene-butadiene copolymer rubber, or acrylate rubber, e.g. an alkyl acrylate rubber such as butyl acrylate rubber. Preferred styrenic copolymer grafted rubber composition comprises from 20 to 45 weight percent of substrate rubber and from 55 to 80 parts by weight of said grafted styrenic copolymer. Preferred grafted styrenic copolymer comprises from 50 to 75 parts by weight of styrene monomer units and from 25 to 50 parts by weight of said polar monomer units. Especially preferred grafted styrene copolymers comprise styrene-acrylonitrile copolymer and styrene-methyl methacrylate copolymer. Exemplary styrenic copolymer grafted rubber compositions include, for instance, butadiene rubber core having grafted thereto a thermoplastic shell of styrene-acrylonitrile copolymer (ABS), a butadiene rubber core having grafted thereto a thermoplastic shell of styrene-methyl methacrylate copolymer (MBS), a butyl acrylate rubber core having grafted thereto a thermoplastic shell of styrene-acrylonitrile copolymer (ASA).

Useful polymer blends of this invention can comprise about 30 to 75 parts by weight styrenic copolymer grafted rubber composition per 100 parts by weight of the blend. Such polymer blends comprise polyester and styrenic copolymer grafted rubber composition in the weight ratio of about 2:1 to about 1:5. In certain preferred applications the blends of this invention comprise 40 to 60 parts by weight styrenic copolymer grafted rubber composition in a polyester to grafted rubber composition weight ratio of 3:2 to 2:3.

The impact modifying mixture used in the polymers blends of this invention consists essentially of a mixture of a fatty acid salt and an acid copolymer, e.g. a copolymer of a styrene monomer and a carboxylic acid.

The addition of acid copolymers without fatty acid salt can provide some enhancement of impact resistance in polymer blends of polyester and styrene copolymer grafted rubber compositions. But, the addition of fatty acid salt without acid copolymer is, as is well-known from common practice, detrimental to impact resistance. What has been surprisingly discovered is that a mixture of fatty acid salt and acid copolymer provides substantially higher impact resistance to such polymer blends than acid copolymers alone.

In the impact modifying mixtures useful in this invention, the fatty acid salt is conveniently a sodium salt of stearic acid. As little as 0.2 percent by weight of the blend of sodium stearate is useful in enhancing the impact resistance of polymer blends according to this invention. In many cases about 1 percent by weight of the blend of sodium stearate has been shown to be optimum in enhancing the impact resistance of such polymer blends. Excess sodium stearate adversely affects impact resistance; for instance, about 5 percent by weight of sodium stearate provides some polymer blends with a lower impact resistance than blends containing acid copolymer and no sodium stearate. Although sodium stearate is a preferred fatty acid salt, other useful fatty acid salts can be readily ascertained by routine experimentation. For instance, other cations, e.g. potassium or aluminum, can be used with stearic acid to provide enhanced impact resistance while stearate salts of certain other cations, e.g. zinc, have exhibited an adverse effect on impact resistance. Useful fatty acids include stearic acid, lauric acid and the like. Other carboxylic acids, e.g. benzoic acid have exhibited an adverse effect on impact resistance.

The acid copolymer of the impact modifying mixture can consist essentially of a styrenic copolymer. In many applications useful polymer blends according to this invention contain about 5 to about 20 parts by weight acid copolymer. The acid component of the acid copolymer can be advantageously provided by maleic anhydride, acid or ester in molar levels of about 10 to 40 percent acid component monomer. For certain applications, polymer blends are provided with high impact resistance with styrene-maleic anhydride copolymers containing about 20–30 mole percent maleic anhydride. Other advantageously useful acid copolymers include terpolymers, e.g. of styrene, maleic anhydride and methyl methacrylate. A preferred terpolymer consists essentially of about 60–82 weight percent styrene, about 15–30 weight percent maleic anhydride and about 3–10 weight percent methyl methacrylate monomer units, e.g. about 68 percent styrene, 25 percent maleic anhydride and about 7 percent methyl methacrylate Other advantageously useful acid copolymers include graft copolymers of rubber and styrene-maleic anhydride, e.g. as available from Atlantic Richfield Company under the Dylark trademark.

Useful impact modifying mixtures comprise acid copolymer and fatty acid salt in the ratio of about 4:1 to about 40:1. Especially useful impact modifier mixtures comprise acid copolymer and fatty acid salt in the ratio of about 7.5:1.

In some applications, e.g. where toughness at low temperatures or thick section toughness is desired, useful polymer blends according to this invention further comprise up to about 20 parts by weight of an acid-functionalized elastomer, e.g. a terpolymer of ethylene, alkyl (meth)acrylate and a mono ester of maleic anhydride, such as VAMAC elastomer available from E. I. duPont de Nemours. Alternatively, it has been surprisingly discovered that low temperature toughness and/or thick section toughness can be provided by incorporating an amorphous polyester, e.g. PETG or PCTG, In addition to the above components the polymer blends of this invention can advantageously contain other additives common to polymer blends of engineering thermoplastics such as antioxidants, stabilizers, flame retardants, dyes, pigments, fillers such as fibers and minerals, and the like. Certain additives such as nucleators, crystallizers and plasticizers which would tend to promote crystallization of PET should be avoided.

The component polymers of the polymer blends of this invention can be assembled by any convenient mixing process, e.g. extrusion blended in a single or twin screw extruder or in a high intensity mixer such as a Banbury Mixer or Farrell Continuous Mixer.

The polymer blends of this invention are especially useful as engineering thermoplastics for applications warranting a balance of properties inherent in such blends, including chemical resistance, e.g. to methanol; low mold shrinkage, e.g. about 6 mils/inch (0.6%); high toughness, e.g. good notched Izod impact resistance even at low temperatures; good mechanical properties, e.g. tensile strength and elongation.

The invention is now described with reference to the following examples which are for purposes of illustration only and are not intended to imply any limitation on the scope of the invention.

COMPONENTS USED

PET: polyethylene terephthalate obtained from Goodyear Corporation as Cleartuf 8006 PET, I.V.:0.8;

ABS: a styrenic copolymer grafted rubber composition obtained by the graft emulsion polymerization of styrene and acrylonitrile in the weight ratio of 73:27 onto nitrile rubber particles comprising butadiene and acrylonitrile in the weight ratio of 93:7; the graft copolymer comprised 38 percent by weight rubber and 62 percent by weight styrene-acrylonitrile copolymer.

SMA: acid copolymer comprising a terpolymer of styrene, maleic anhydride and methyl methacrylate in the weight ratio 68:25:7.

SANGMA: a terpolymer of styrene, acrylonitrile and glycidyl methacrylate in the weight ratio 78:28:1.75.

NaS: fatty acid salt comprising sodium stearate.

AlS: fatty acid salt comprising aluminum stearate.

ZnS: fatty acid salt comprising zinc stearate.

NaB: carboxylic acid salt comprising sodium benzoate.

KM-330: an acrylate graft rubber composition obtained from Rohm & Haas as Acryloid KM-330.

PETG: an amorphous copolyester of terephthalic acid and mixed diols, i.e. ethylene gylcol and 1,4-cyclohexanediol, obtained from Eastman Chemicals Company as PETG6763.

VAMAC: a terpolymer elastomer comprising ethylene, methyl acrylate and mono ethyl maleate obtained from duPont as VAMAC G.

The polymer blends described in the following examples contained about 1 percent by weight of an antioxidant mixture comprising 2 parts by weight alkylated phenol obtained from Ethyl Corp as Ethanox 330 and 1 part by weight dilaurylthiopropionate obtained from Morton Thiokol Company.

In the following examples components were dried before mixing under vacuum or nitrogen, e.g. PET and SMA at about 100° C., PETG at about 70° C., and ABS at about 65° C. When VAMAC was used, it was pre-blended with ABS intimately mixed at about 100 rpm in a Killion single screw extruder (3.8 cm diameter). The blended components were extruded into a water bath and pelletized. For characterization the polymer blends were injection molded into notched specimen bars for Izod impact resistance testing according to ASTM D-

256. Unless indicated otherwise the term IZOD describes the notched Izod impact resistance of a ⅛ inch thick specimen bar having a notch radius of 0.01 inches measured at room temperature (about 23° C.).

EXAMPLE 1

This example serves to illustrate the advantageous effect of impact modifying mixtures comprising a fatty acid salt and an acid copolymer in blends of crystallizable polyester consisting essentially of PET and styrenic copolymer grafted rubber composition, i.e. ABS.

Polymer blends prepared with the composition indicated in Table 1 were tested for impact resistance. The notched Izod impact resistance reported in Table 1 illustrates (a) that the blend of PET and ABS has moderate toughness, i.e. 1.9 foot-pounds per inch; (b) that the addition of a fatty acid salt, i.e. NaS, has an adverse effect on impact resistance; (c) that the addition of an acid styrenic copolymer, i.e. SMA, substantially improves toughness to 3.3 foot-pounds per inch; (d) that the use of a low amount (0.2%) of the fatty acid salt along with the acid styrenic copolymer surprisingly substantially improves toughness about as much as the use of an acid styrenic copolymer alone; (e) that the use of moderate amounts (1%) of the fatty acid salt along with the acid styrenic copolymer unexpectedly provides a synergistic and substantial improvement in toughness to 7.8 foot-pounds per inch; and (f) that the use of high amounts (5%) of the fatty acid salt has an adverse effect on toughness even when the acid copolymer is used.

TABLE 1

| | Components (parts by weight) | | | | | |
|---|---|---|---|---|---|---|
| | 1A | 1B | 1C | 1D | 1E | 1F |
| PET | 50 | 49 | 42.5 | 42.3 | 41.5 | 37.5 |
| ABS | 50 | 50 | 50 | 50 | 50 | 50 |
| SMA | 0 | 0 | 7.5 | 7.5 | 7.5 | 7.5 |
| NaS | 0 | 1 | 0 | 0.2 | 1 | 5 |
| IZOD | 1.9 | 0.6 | 3.3 | 3.0 | 7.8 | 0.6 |

EXAMPLE 2

This example illustrates polymer blends according to the prior art comprising PET and acrylate impact modifier, i.e. KM-330. This example also illustrates that the impact modifying mixtures useful in the polymer blends of this invention have an adverse effect on prior art blends of PET and acrylate impact modifier.

TABLE 2

| | Component (parts by weight) | | |
|---|---|---|---|
| | 2A | 2B | 2C |
| PET | 75 | 75 | 75 |
| KM-330 | 25 | 25 | 25 |
| SMA | 0 | 7.5 | 7.5 |
| NaS | 0 | 0 | 1 |
| IZOD | 2.2 | 1.9 | 1.3 |

EXAMPLE 3

This example serves to illustrate the range of composition of polymer blends of crystallizable polyester and styrenic copolymer grafted rubber composition that can be advantageously toughened by the use of the impact modifying mixtures of this invention.

TABLE 3

| | Components (parts by weight) | | | |
|---|---|---|---|---|
| | 3A | 3B | 3C | 3D |
| PET | 61.5 | 41.5 | 31.5 | 16.5 |
| ABS | 30 | 50 | 60 | 75 |
| SMA | 7.5 | 7.5 | 7.5 | 7.5 |
| NaS | 1 | 1 | 1 | 1 |
| PET/ABS | 2:1 | 1:1 | 1:2 | 1:5 |
| IZOD | 2.5 | 5.9 | 4.6 | 2.9 |

EXAMPLE 4

This example serves to illustrate that low temperature or thick section toughness of polymer blends according to this invention can be enhanced by the addition of acid containing elastomer (i.e. VAMAC) or up to 50% by weight of another amorphous polyester (i.e. PETG). The data reported in Table 4 illustrates that such polymer blends surprising have exception toughness in thick sections (i.e. notched Izod impact resistance measured on ¼ inch thick specimen bars) and exceptional toughness at low temperature (i.e. notched Izod impact resistance measured on ⅛ inch specimen bars at −20° C.).

TABLE 4

| | Components (parts by weight) | | | | |
|---|---|---|---|---|---|
| | 4A | 4B | 4C | 4D | 4E |
| PET | 50 | 42.5 | 41.5 | 56.5 | 20.75 |
| PETG | 0 | 0 | 0 | 0 | 20.75 |
| ABS | 50 | 50 | 50 | 30 | 50 |
| VAMAC | 0 | 0 | 0 | 8 | 0 |
| SMA | 0 | 7.5 | 7.5 | 4.5 | 7.5 |
| Na | 0 | 0 | 1 | 1 | 1 |
| IZOD[a] | 1.9 | 3.3 | 7.8 | 13.2 | 7.3 |
| IZOD[b] | 1.4 | 2.2 | 3.8 | 6.9 | 8.8 |
| IZOD[c] | 0.9 | 1.8 | 2.4 | 4.0 | 10.0 |

[a] Izod measured on ⅛ inch bars at 23° C.
[b] Izod measured on ¼ inch bars at 23° C.
[c] Izod measured on ⅛ inch bars at −20° C.

EXAMPLE 5

This example serves to illustrate that aluminum stearate, but not zinc stearate or sodium benzoate, is useful as a fatty acid salt in the impact modifying mixtures of this invention and that a synergistic effect on toughness is not exhibited from a mixture of fatty acid salt and non-acid styrenic copolymers, i.e. a terpolymer of styrene, acrylonitrile and glycidyl methacrylate, an otherwise useful impact modifier for blends of PET and ABS.

TABLE 5

| | Components (parts by weight) | | | | |
|---|---|---|---|---|---|
| | 5A | 5B | 5C | 5D | 5E |
| PET | 41.5 | 41.5 | 41.5 | 40 | 39 |
| ABS | 50 | 50 | 50 | 50 | 50 |
| SMA | 7.5 | 7.5 | 7.5 | 0 | 0 |
| SANGMA | 0 | 0 | 0 | 10 | 10 |
| AlS | 1 | 0 | 0 | 0 | 0 |
| ZnS | 0 | 1 | 0 | 0 | 0 |
| NaB | 0 | 0 | 1 | 0 | 0 |
| NaS | 0 | 0 | 0 | 0 | 1 |
| IZOD | 2.5 | 0.7 | 1.0 | 3.0 | 0.6 |

What is claimed is:
1. A polymer blend consisting essentially of:
(A) styrenic copolymer grafted rubber composition comprising from 5 to 80 weight percent of a substrate rubber hanging a glass transition temperature below 0° C. and from 95 to 20 weight percent of a grated copolymer consisting essentially of from 20 to 75 parts by weight of styrene monomer and from 80 to 25 parts by weight of a polar monomer selected from $C_1$ to $C_4$ alkyl (meth)acrylate and (meth)acrylonitrile, said monomers having been polymerized in the presence of and grafted onto the substrate rubber;

(B) polyester consisting of a mixture of polyethylene terephthalate and an amorphous polyester of phthalic acid and a mixture of ethylene glycol and 1,4-cyclohexane dimethanol; and (C) an impact modifying amount of a mixture consisting essentially of a fatty acid salt of sodium, potassium or aluminum and an acid copolymer comprising styrene monomer and carboxylic acid monomer;

wherein components (A) and (B) are present in the weight ratio of polyester to styrenic copolymer grafted rubber composition of 2:1 to 1:5.

2. A polymer blend according to claim 1 wherein said styrenic copolymer grafted rubber composition comprises a grafted copolymer consisting essentially of a styrene-acrylonitrile copolymer.

3. A polymer blend according to claim 2 wherein said fatty acid salt is a sodium or aluminum salt of stearic acid.

4. A polymer blend according to claim 3 comprising from 0.1 to 5 parts by weight of said fatty acid salt.

5. A polymer blend according to claim 4 comprising from 5 to 20 parts by weight of said acid copolymer.

6. A polymer blend according to claim 5 wherein said acid copolymer consists essentially of a copolymer of styrene and maleic anhydride.

7. A polymer blend according to claim 5 wherein said acid copolymer is a terpolymer consisting essentially of units of styrene monomer, a dicarboxylic acid monomer and a polar monomer which is a $C_1$-$C_4$ alkyl (meth)acrylate or (meth)acrylonitrile.

8. A polymer blend according to claim 7 wherein said terpolymer consists essentially of units of styrene, maleic-anhydride and methyl methacrylate monomer.

9. A polymer blend according to claim 8 wherein said terpolymer consists of about 60-82 weight percent styrene, about 15-30 weight percent maleic anhydride and about 3-10 weight percent methyl methacrylate monomer units.

10. A polymer blend consisting essentially of:

(A) styrenic copolymer grafted rubber composition comprising from 20 to 45 weight percent of a crosslinked butadiene or alkyl acrylate substrate rubber hanging a glass transition temperature below 0° C. and from 50 to 80 weight percent of a grated styrenic copolymer consisting essentially of from 50 to 75 parts by weight of styrene monomer and from 50 to 25 parts by weight of acrylonitrile monomer, said monomers having been polymerized in the presence of and grafted onto the substrate rubber;

(B) polyester consisting essentially of a mixture of polyethylene terephthalate and an amorphous polyester of phthalic acid and a mixture of ethylene glycol and 1,4-cyclohexane dimethanol; and (C) an impact modifying amount of a mixture consisting essentially of a fatty acid salt of sodium, potassium or aluminum and an acid copolymer comprising styrene monomer and carboxylic acid monomer units;

wherein components (A) and (B) are present in the weight ratio of polyester to styrenic copolymer grafted rubber composition of 2:1 to 1:5.

11. A polymer blend according to claim 10 wherein said acid copolymer consists essentially of a terpolymer of styrene, maleic anhydride and methyl methacrylate and said fatty acid salt is a stearic acid salt.

* * * * *